(12) United States Patent
Schnell et al.

(10) Patent No.: US 7,621,140 B2
(45) Date of Patent: Nov. 24, 2009

(54) TEMPERATURE CONTROL IN A SPACE SERVED BY MULTIPLE HVAC EQUIPMENT

(75) Inventors: Robert J. Schnell, Plymouth, MN (US); Marcus D. Stoner, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 726 days.

(21) Appl. No.: 11/162,212

(22) Filed: Sep. 1, 2005

(65) Prior Publication Data

US 2007/0044501 A1    Mar. 1, 2007

(51) Int. Cl.
G05D 23/12 (2006.01)
F25D 15/00 (2006.01)

(52) U.S. Cl. .............. 62/157; 62/231; 62/331; 236/1 C

(58) Field of Classification Search .......... 62/157, 62/159, 160, 231, 331; 236/1 C
See application file for complete search history.

(56) References Cited

U.S. PATENT DOCUMENTS

| | | |
|---|---|---|
| 3,996,998 A | 12/1976 | Garst et al. |
| 4,102,389 A | 7/1978 | Wills |
| 4,102,390 A | 7/1978 | Harnish et al. |
| 4,143,707 A | 3/1979 | Lewis et al. |
| 4,178,988 A | 12/1979 | Cann et al. |
| 4,190,199 A | 2/1980 | Cawley et al. |
| 4,298,056 A | 11/1981 | Nelson |
| 4,445,567 A | 5/1984 | Nelson |
| 4,474,227 A | 10/1984 | Reedy |
| 4,476,920 A | 10/1984 | Drucker et al. |
| 4,598,764 A | 7/1986 | Beckey |
| 4,627,483 A | 12/1986 | Harbarger et al. |
| 4,703,795 A | 11/1987 | Beckey |
| 4,821,526 A * | 4/1989 | Otsuka et al. ............. 62/180 |
| 4,860,552 A | 8/1989 | Beckey |
| 4,910,966 A | 3/1990 | Levine et al. |
| 4,971,136 A | 11/1990 | Mathur et al. |
| 5,259,445 A | 11/1993 | Pratt et al. |
| 5,405,079 A | 4/1995 | Neeley et al. |
| 5,488,218 A | 1/1996 | Olsen et al. |
| 5,752,654 A | 5/1998 | Mowery, Sr. et al. |
| 6,101,824 A | 8/2000 | Meyer et al. |
| 6,119,950 A | 9/2000 | Albanello et al. |
| 6,176,306 B1 | 1/2001 | Gault |
| 6,478,233 B1 | 11/2002 | Shah |
| 6,729,390 B1 | 5/2004 | Toth et al. |
| 7,261,243 B2 * | 8/2007 | Butler et al. ............. 236/1 C |

OTHER PUBLICATIONS

Bill Porter, Bill Porter's BPC-1 Dual Fuel™ Control, 2 pages, 1999.
Carrier, "Programmable Dual Fuel Thermostat," Installation, Start-Up & Operating Instructions, pp. 1-12, Oct. 1998.
Installer's Guide, Add-On heat Pump Kit, Model TAYPLUS103A, American Standard, Inc., 4 pages, 1996.

(Continued)

*Primary Examiner*—Marc E Norman

(57) ABSTRACT

A system and method for regulating the operation of first and second temperature modification sources for heating or cooling a building structure is provided. The system switches between the first and second temperature modification sources based on conditions other than just outside temperature.

27 Claims, 9 Drawing Sheets

OTHER PUBLICATIONS

Invensys™, "9700i 9701i 9715i 9720i Deluxe Programmable Thermostats," User's Manual, 21 pages, printed prior to Dec. 2, 2003.

Lux, "602 Series Multi-Stage Programmable Thermostat," Owner's Manual, 2 pages, printed prior to Dec. 2, 2003.

Totaline, "Programmable Thermostat Configurable for Advanced Heat Pump or Dual Fuel Operation," Owner's Manual P/N P374-1500, 24 pages, Jun. 1999.

TZ-3 TotalZone® Zone Control Panel, Product Data Sheets, pp. 1-16, Honeywell, Copyright 2001.

TZ-4 TotalZone® Zone Control Panel, Product Data Sheets, pp. 1-20, Honeywell, Copyright 2002.

White-Rodgers, 1F81-261 "Programmable Electronic Digital Multi-Stage Thermostat," Installation and Operation Instructions, 8 pages, printed prior to Dec. 2, 2003.

www.icmcontrols.com, Simplecomfort, SC3201 2 Stage Heat Pump Manual Changeover, 1 page, printed prior to Dec. 2, 2003.

www.icmcontrols.com, Simplecomfort, SC3801 2 Stage Heat/2 Stage Cool 2 Stage Heat Pump/Audio Changeover, 1 page, printed prior to Dec. 2, 2003.

* cited by examiner

TEMPERATURE CONTROL IN A SPACE SERVED BY MULTIPLE HVAC EQUIPMENT

BACKGROUND

The present invention generally relates to methods and systems for controlling multiple temperature modification sources that service a building or other enclosed space, and more specifically, to methods and systems for controlling which temperature modification source(s) is used at any given time.

Buildings and other structures often include multiple temperature modification devices or systems to help control the temperature and/or other environmental parameters within the building. For example, some buildings include both a fossil fuel furnace and a heat pump. In this example, and under some conditions, it is more cost efficient to use the heat pump to heat the building space than the fossil fuel furnace. However, under other conditions, such as when the outside air temperature drops and the efficiency of the heat pump drops, it may be more desirable to activate the fossil fuel furnace and de-activate the heat pump. In this example, the fossil fuel furnace can be considered an auxiliary heat source.

In many cases, and continuing with the above example, it is undesirable to operate both the heat pump and fossil fuel furnace at the same time. That is, either the heat pump is enabled or the fossil fuel furnace is enabled, but not both at the same time. In many cases, the determination of whether the heat pump or the fossil fuel furnace provides heat to the building is based only on the outdoor air temperature. That is, when the outdoor air temperature drops below a heat pump lockout temperature, the control system locks out the heat pump and activates the fossil fuel furnace. The fossil fuel furnace is then used until the outside air temperature rises above the heat pump lockout temperature.

It has been found that using only the outside air temperature to determine when the system transitions between the heat pump and the fossil fuel furnace can result in inefficient operation. For example, under some conditions the heat pump may be able to satisfy the heat load of the building even when the outside air temperature is at or below the heat pump lockout temperature. For example, on a sunny day the sun may provide sufficient green house heating to the building to reduce the heating load so that the heat pump can satisfy the heat load, even though the outside air temperature is at or near the heat pump lockout temperature. In addition, under some conditions the heat pump may not be able to satisfy the heat load of the building even though the outside air temperature is above the heat pump lockout temperature. For example, on a windy night the heat load of the building may exceed the heating capacity of the heat pump even though the outside air temperature is above the heat pump lockout temperature. It has been found that there are many factors that may effect when it is most appropriate to transition between a primary heating/cooling source and an auxiliary heating/cooling source including, for example, building construction and insulation, current weather conditions (sun, clouds, wind, humidity, precipitation, time of day, season, etc.), inside air temperature set point, outside air temperature, as well as other factors.

SUMMARY

The present invention generally relates to methods and systems for controlling the operation of multiple temperature modification sources that service a building or other enclosed space, and more specifically, to methods and systems for controlling which temperature modification source or system should be used at any given time for increased energy efficient operation.

In one illustrative embodiment of the present invention, a building or other enclosed space is serviced by an environmental control system that includes multiple temperature modification sources such as a first temperature modification source (e.g. a heat pump) and a second temperature modification source (e.g. a fossil fuel furnace and/or air conditioning system). With the first temperature modification source (e.g. heat pump) enabled and the second temperature modification (e.g. a fossil fuel furnace and/or air conditioning system) disabled, the illustrative system may determine if the temperature of the inside space of the building is moving away from or not reaching a desired temperature set point in a desired time period. When this occurs, the system may disable (e.g. lock out) the first temperature modification source (e.g. heat pump) and at least selectively activate the second temperature modification source (e.g. a fossil fuel furnace and/or air conditioning system). In some embodiments, the second temperature modification source modifies the temperature of the inside space more rapidly than the first temperature modification source. The second temperature modification source may be more expensive to operate than the first temperature modification source.

After the second temperature modification source is at least selectively activated, the system may determine if/when the temperature of the inside space of the building has a predetermined relationship with the temperature set point, and if/when this occurs, the system may disable (e.g. lock out) the second temperature modification source (e.g. a fossil fuel furnace and/or air conditioning system) and at least selectively activate the first temperature modification source (e.g. heat pump). In some embodiments, the system waits a predetermined period of time after the temperature of the inside space has a predetermined relationship with the temperature set point before disabling the second temperature modification source and selectively activating the first temperature modification source. The determination of if/when the temperature of the inside space of the building has a predetermined relationship with the temperature set point can involve determining if/when the temperature of the inside space is within a predetermined range of the desired temperature set point.

In this illustrative embodiment, the determination of whether the first temperature modification source should be disabled is based on whether the first temperature modification source is able to satisfy a current call for heat within a predetermined time period. If not, the second temperature modification source is enabled and the first temperature modification source may be locked out. Once the second temperature modification source satisfies the current call for heat, the system may disable the second temperature modification source and enable the first temperature modification source to see if it can meet the next or some subsequent call for heat. In some cases, the second temperature modification source is used for a predetermined time period or until a change in one or more conditions is detected before re-enabling the first temperature modification source, but this is not required in all embodiments.

In other embodiments, the determination of whether the first temperature modification source should be disabled is based on whether the temperature of the inside space of the building is moving toward the temperature set point. If not, the first temperature modification source is disabled and the second temperature modification source is activated to satisfy the call for heat. Once the call for heat is satisfied, the second temperature modification is disabled and the system waits for the next call for heat.

In a further embodiment, a controller is provided for controlling the environmental control system. The controller includes means for disabling the first and second temperature modification sources, means for at least selectively activating the first and second temperature modification sources, and means for determining if the temperature of the inside space of the building is moving away from the temperature set point and/or not reaching the temperature set point within a predetermined period of time. The controller may also include means for determining if/when the temperature of the inside space of the building has a predetermined relationship with the temperature set point after the second temperature modification source is at least selectively activated.

A method is provided for controlling an environmental control system that has a first temperature modification source, a second temperature modification source, and a temperature set point. The method includes the steps of disabling the second temperature modification source, at least selectively activating the first temperature modification source, determining to activate the second temperature modification source and to disabled the first temperature modification source, disabling the first temperature modification source, at least selectively activating the second temperature modification source, determining a load on the second temperature modification source, determining if/when the load on the second temperature modification source falls below a load limit, and if so, then disabling the second temperature modification source and at least selectively activating the first temperature modification source.

In another method for controlling an environmental control system, after the steps of disabling the second temperature modification source and at least selectively activating the first temperature modification source, the method involves determining a load on the first temperature modification source, and if the load on the first temperature modification source exceeds a predetermined load level, then disabling the first temperature modification source and at least selectively activating the second temperature modification source. The method may also include the steps of determining if/when the load on the second temperature modification source falls below a predetermined load level, and if so, then disabling the second temperature modification source and at least selectively activating the first temperature modification source. In a further embodiment, the predetermined load levels of the first and second temperature modification devices are based at least in part on one or more operating conditions, such as an outside air temperature, an outside humidity level, an outside wind speed, an outside wind direction, a precipitation value, a time of day value, a time of year value, or a temperature set point for the inside space.

A method is provided for controlling an HVAC system including a heat pump and a fuel fired furnace in which the fuel-fired furnace is disabled and the heat pump is at least selectively activated. Then, based on a determination that one or more outdoor conditions external to the building has fallen outside of a predetermined threshold, the heat pump is disabled and the fuel-fired furnace is at least selectively activated. After a predetermined period of time, the fuel-fired furnace is disabled and the heat pump is at least selectively activated.

DETAILED DESCRIPTION

The following description should be read with reference to the drawings. The detailed description and drawings show several illustrative embodiments which are meant to be illustrative of the present invention.

Figure 1:
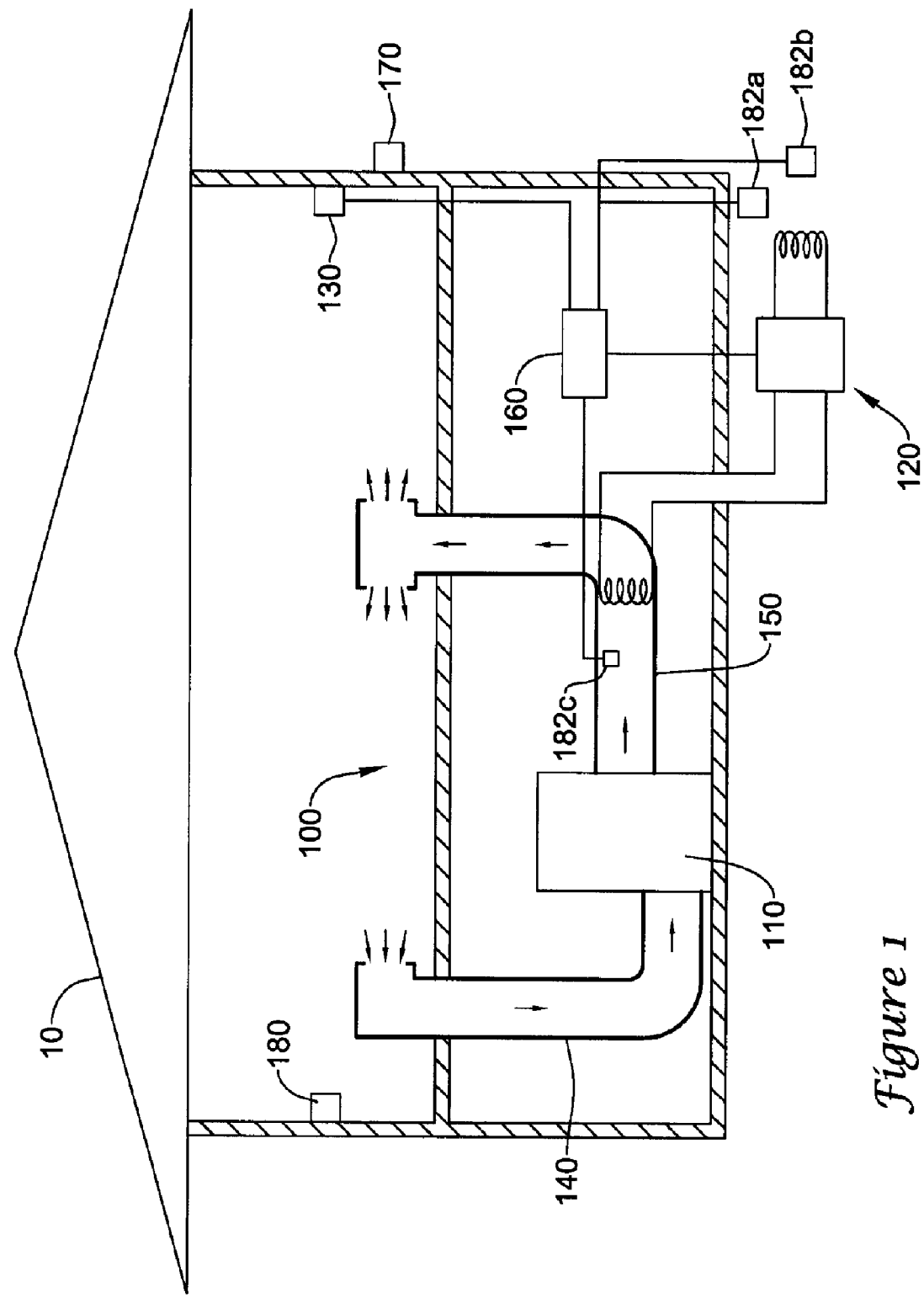
FIG. 1 is a plan view of a building that is serviced by a first and a second temperature modification source.

FIG. 1 is a plan view of a building or other enclosure 10 that is serviced by a first and a second temperature modification source. While a house is shown in FIG. 1, it is contemplated that the present invention may be used in conjunction with any type of enclosure that has multiple temperature modification sources including, for example, apartments, townhouses, small and large commercial buildings, and/or any other type of building structure, as desired. In addition, while only a first and a second temperature modification source are shown, it is contemplated that two or more temperature modifications sources may be used, as desired.

In the illustrative embodiment, the first temperature modification source is a heat pump 120, and the second temperature modification source is a fossil fuel furnace 110. The furnace 110 can be, for example, a gas, oil, propane, or electric furnace, boiler, or any other suitable heater. In some embodiments, the second temperature modification source is an air conditioner. In other embodiments, the system includes both a furnace and an electric air conditioner, with either the furnace or air conditioner functioning as the second temperature modification source. In such systems, a switch is generally made between running the furnace as the second temperature modification source and running the air conditioner as the second temperature modification source, depending on the outside temperature or the season. The illustrative control system 100 is adapted to control the inside air temperature by regulating the heat pump 120 and furnace 110. The illustrative system 100 includes a thermostat 130 and a controller 160. The thermostat 130 and controller 160 may be housed in separate units, or in the same unit, as desired.

In FIG. 1, the furnace 110 is located within the enclosure 10, and the heat pump 120 is located outside of the enclosure 10. In some systems, the furnace 110 may also be located outside of the enclosure 10. The system may receive air through return ducts 140 and deliver air to the enclosure 10 via supply ducts 150. The heat pump 120 may pump heat into the enclosure 10 to heat the enclosure 10, and may pump heat from the enclosure 10 to help cool the enclosure 10. An electric air conditioner (not shown), may also be provided outside of the enclosure 10, and may act as an auxiliary cooling source, if desired.

In some illustrative embodiments, the control system 100 may include or have access to one or more sensors 170, 180, and 182a-182c located outside and/or inside of the enclosure 10 for sensing various parameters including, for example, inside and/or outside air temperature, sunlight, wind direction and/or speed, humidity, precipitation, and/or any other desired parameter.

As used herein, the terms "disabled" and "locked out" are used to describe a situation in which the temperature modification source is inoperable due to an override by the control system, and "activated" is used to describe a situation in which the temperature modification source is enabled and may or may not be currently running. In addition, as used herein, "temperature set point" is the temperature selected by the user as the desired inside air temperature. In the heating mode, an inside air temperature that is below the set point may result in a call for heat, and in the cooling mode, an air inside temperature that is above the set point may result in a call for cooling.

In many cases, a first temperature modification source may be generally more energy efficient, and thus cheaper to operate, than a second temperature modification source. The second temperature modification source may, however, modify the inside temperature more rapidly than the first temperature modification source. The most energy and cost efficient manner of operating the temperature modification systems may thus be to run the first temperature modification source as much as possible, switching to the second temperature modification source when the first temperature modification source fails to meet the current heat load, and switching back to the first temperature modification source as soon as practicable.

When the weather conditions and selected set point temperature are such that the indoor air temperature can be maintained by the capacity of the first temperature modification source, the first temperature modification source may cycle on and off in a conventional manner, and the second temperature modification source may be disabled. Many factors influence the ability of the first temperature modification source to meet the building's heat load and thus maintain the desired temperature set point. Examples of such factors include, but are not limited to, changes in the heating or cooling load, changes in the capacity of the first temperature modification source, and outdoor weather conditions, as well as others.

In the examples provided below, a heat pump is used as an example of a first temperature modification source, and a furnace or air conditioner is used as an example of a second temperature modification source. It is contemplated, however, that the present invention may be used in conjunction with any type of environmental control system having temperature modification sources including, for example, heat pumps, furnaces, boilers, air conditioners, and/or any other suitable devices that are capable of modifying the air temperature of an enclosure, as desired.

Many heating systems utilize both a heat pump as the first temperature modification source and a fossil fuel furnace as the second temperature modification source. A control system then switches between the two heat sources based entirely on the outside temperature, known as the heat pump lockout temperature. Typically, the heat pump alone operates when the outside air temperature is above a heat pump lockout temperature, and the heat pump is locked out and the furnace is activated when the outside air temperature falls below the heat pump lockout temperature.

Because the capacity of the heat pump degrades as the outside air temperature drops, the indoor air temperature may begin to drop off from the desired inside air temperature set point, sometimes significantly, before the outside air temperature reaches the heat pump lockout temperature. This may result in an uncomfortably large indoor temperature fluctuation. Controlling the operation of first and second temperature modification sources based on the indoor temperature may provide a more closely regulated environment, maintaining the indoor temperature at a more constant temperature.

In situations where the first temperature modification source is not able to maintain the desired inside air temperature, even with an outside temperature above the lockout temperature, the first heating source may be disabled and the second temperature modification source may be activated. The second temperature modification source is often capable of heating the enclosure more rapidly than the first heating source, and may also be more expensive to operate. An example of one such situation is when the outside temperature is above the lockout temperature, but high wind causes increased heat loss from the building thereby increasing the heat load presented by the building. In this situation the heat pump may not have the capacity to maintain the desired inside air temperature. Rather than waiting for the outside temperature to drop to the lockout temperature before activating the furnace, and likely experiencing a significant drop in inside temperature, regulating the operation of the heat pump and furnace based on the inside air temperature can lockout the heat pump whenever the inside air temperature drops by a predetermined amount, and activate the furnace to more rapidly heat the enclosure, thus maintaining a more constant inside temperature.

In another situation, the first temperature modification source may be able to provide adequate heat even when the outside temperature is below the lockout temperature. On a sunny day, a house with south facing windows may receive enough solar energy to reduce the heat load of the building such that a heat pump can maintain the desired set point inside air temperature. In a conventional heat pump and furnace system, when the outside temperature falls below the lockout temperature, the heat pump is locked out and the furnace is activated. However, while the furnace provides the necessary heat, running the furnace is often more expensive to operate than the heat pump. Similarly, for a cooling system, a heat pump may be able to maintain the cooling set point temperature if, for example, the humidity is low and/or if it is cloudy. In such situations, it would be desirable to operate the heat pump instead of the more expensive electric air conditioner.

Figure 2:
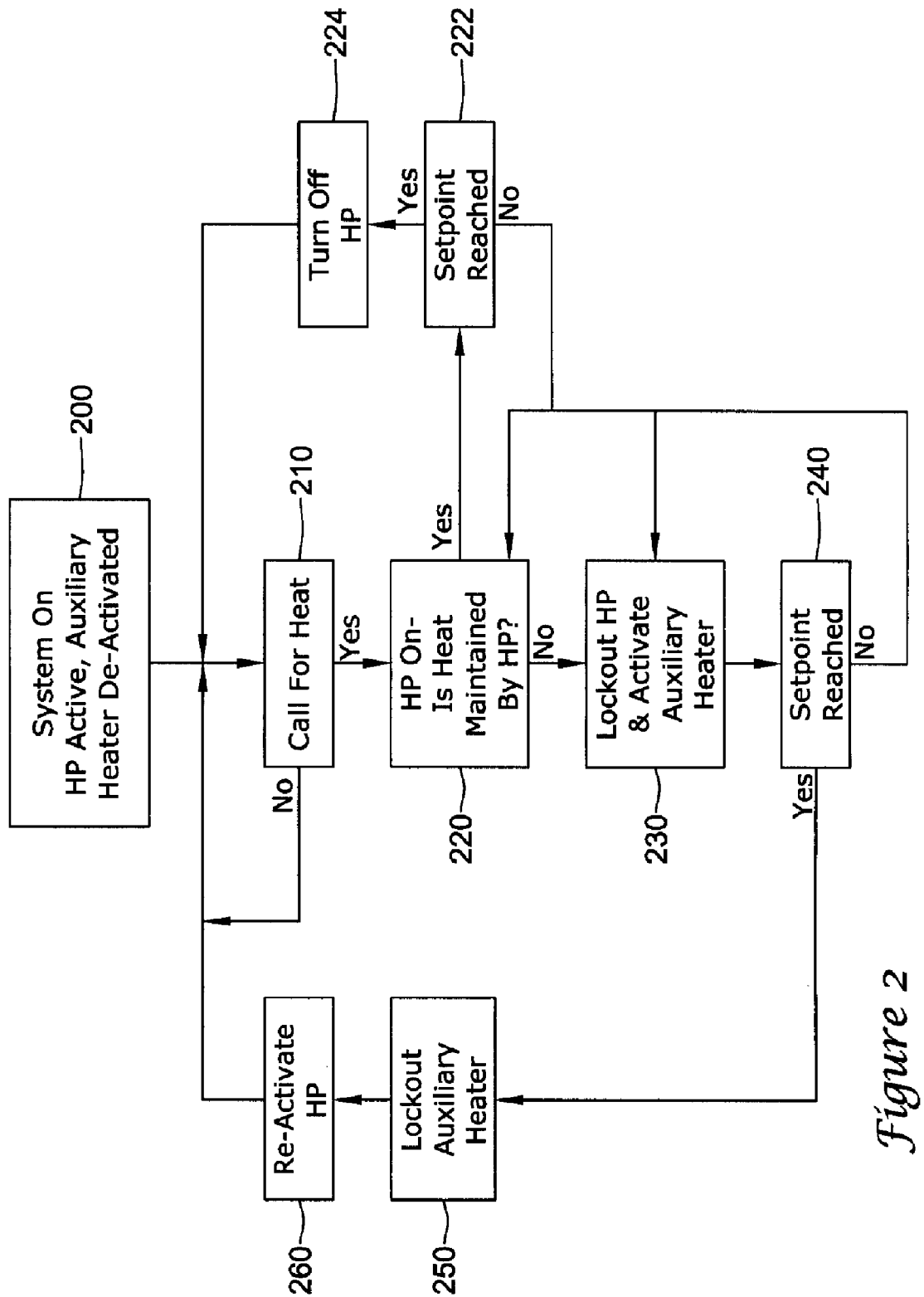
FIG. 2 is a flow chart showing an illustrative method for controlling the first and second temperature modification sources of FIG. 1.

In one embodiment, illustrated in FIG. 2, the system is operated as follows. In block 200, the auxiliary heater, for example a furnace, is disabled and the heat pump (HP) is activated. In block 210 a call for heat is received and the heat pump is turned on to provide heat to the building. In block 220 a determination is made whether the heat pump is providing the desired level of heat. If so, the heat pump remains on until the temperature set point is reached, as shown in block 222. In block 224, the heat pump is turned off once the temperature set point in reached, and the cycle is repeated when another call for heat is received. If the heat pump is not providing the desired level of heat, (e.g. not meeting the current load) the heat pump is locked out and the furnace is turned on, as shown in block 230. In block 240, the temperature set point is reached, in block 250 the furnace is locked out and in block 260 the heat pump is re-activated. When the next call for heat is received, the heat pump is again turned on. Operating the system in this manner allows for the more cost-efficient heat pump to be used, at least initially, for each call for heat. The furnace is only used when the heat pump is unable to satisfy the call for heat.

Figure 3:
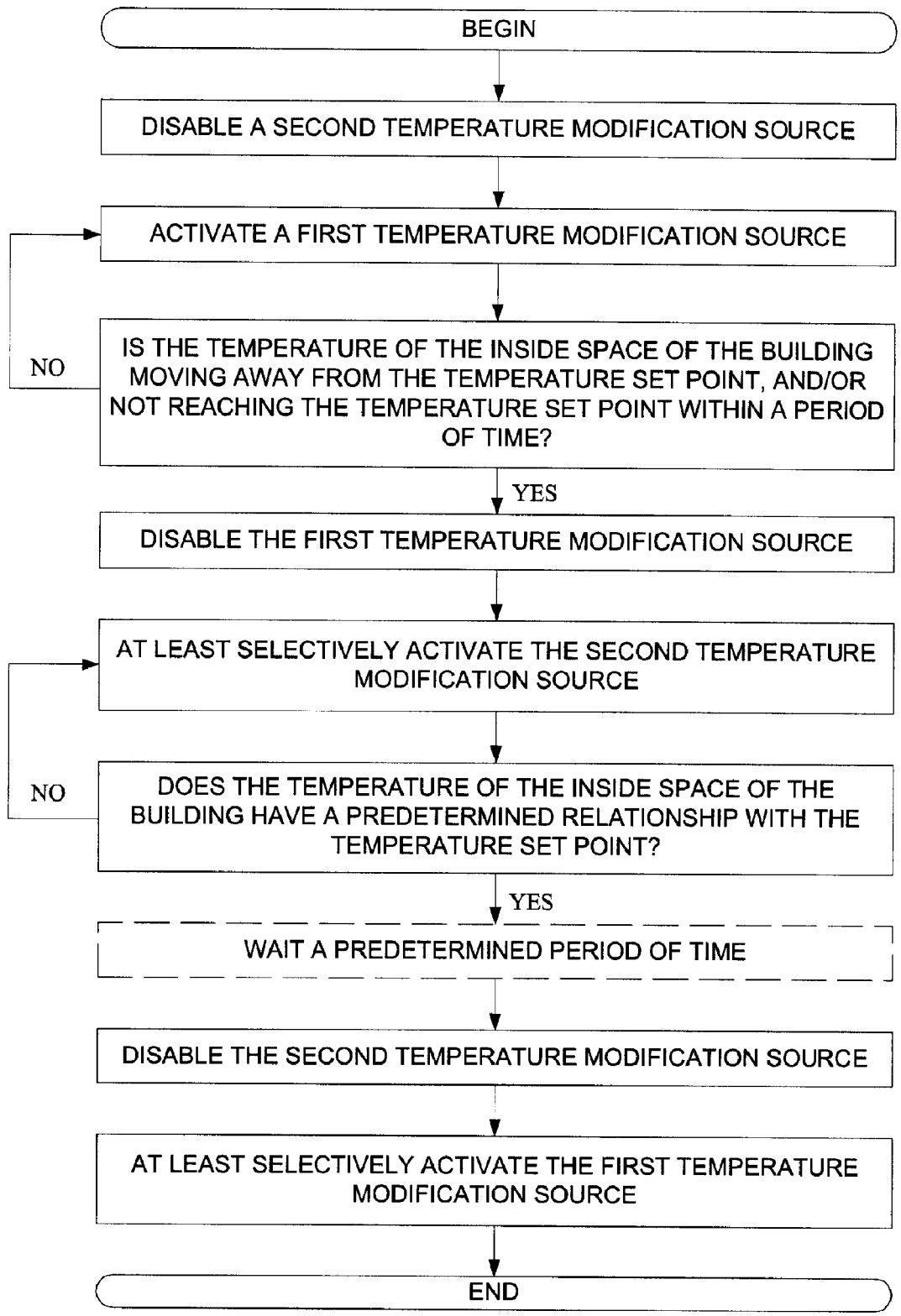
FIGS. 3-8 are flow charts showing other illustrative methods for controlling the first and second temperature modification sources of FIG. 1.

In another embodiment, the furnace is disabled and the heat pump is activated when heat is required. A determination is made regarding whether the temperature of the inside space is moving away from or not reaching an inside temperature set point. This may be accomplished in any number of ways including, for example, by measuring the temperature of the inside space at a first time and comparing it to a measurement taken at a later time. If the temperature of the inside space is moving away from or not reaching an inside temperature set point, the heat pump is disabled and the furnace is at least selectively activated. A subsequent determination is then made regarding whether the inside temperature has a predetermined relationship with the temperature set point, and if so, the furnace is disabled and the heat pump is at least selectively activated. One illustrative method is shown in FIG. 3. The predetermined relationship between the current temperature and the temperature set point may be that the temperature of the inside space is within a predetermined range of the inside temperature set point. This method may provide a bias toward operating the heat pump over the furnace, and may provide increased energy savings.

Figure 4:
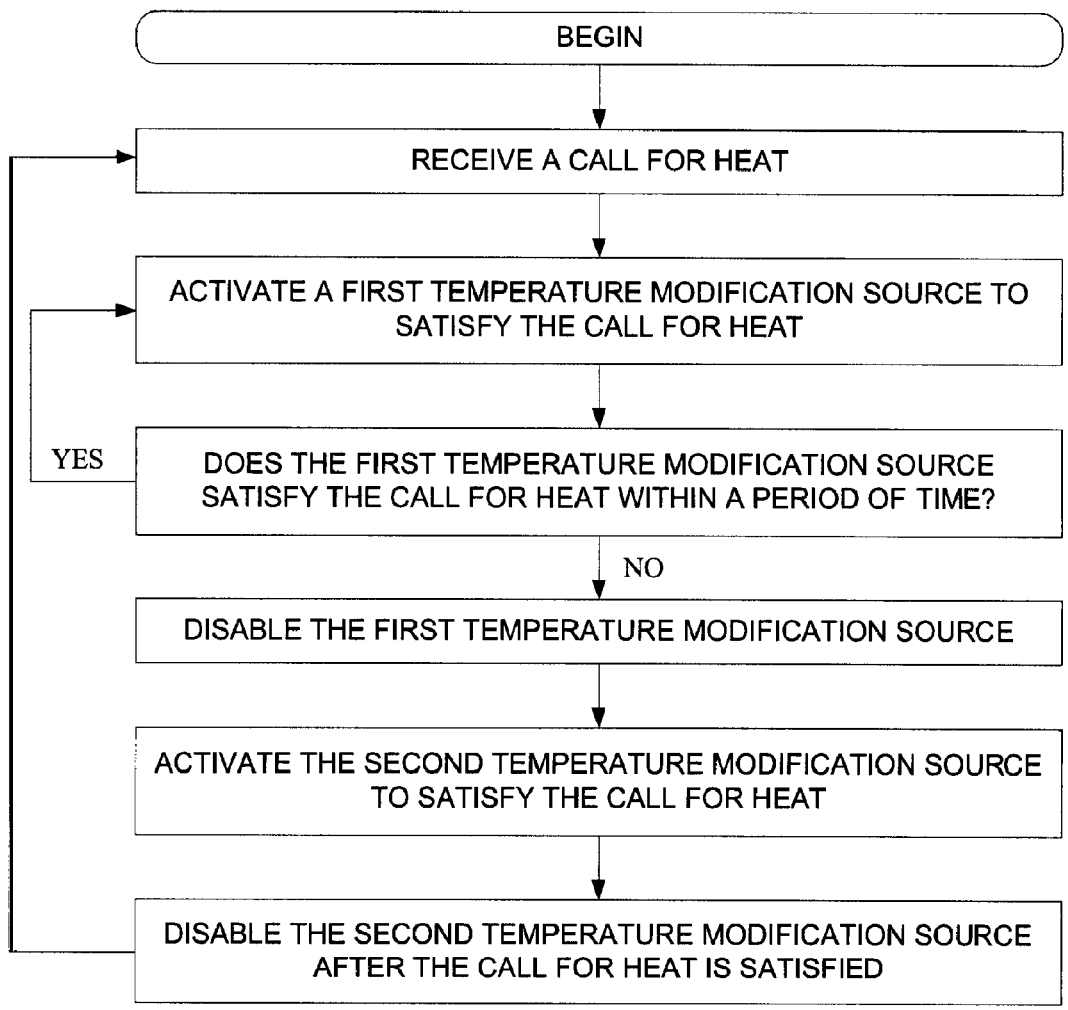
Figure 5:
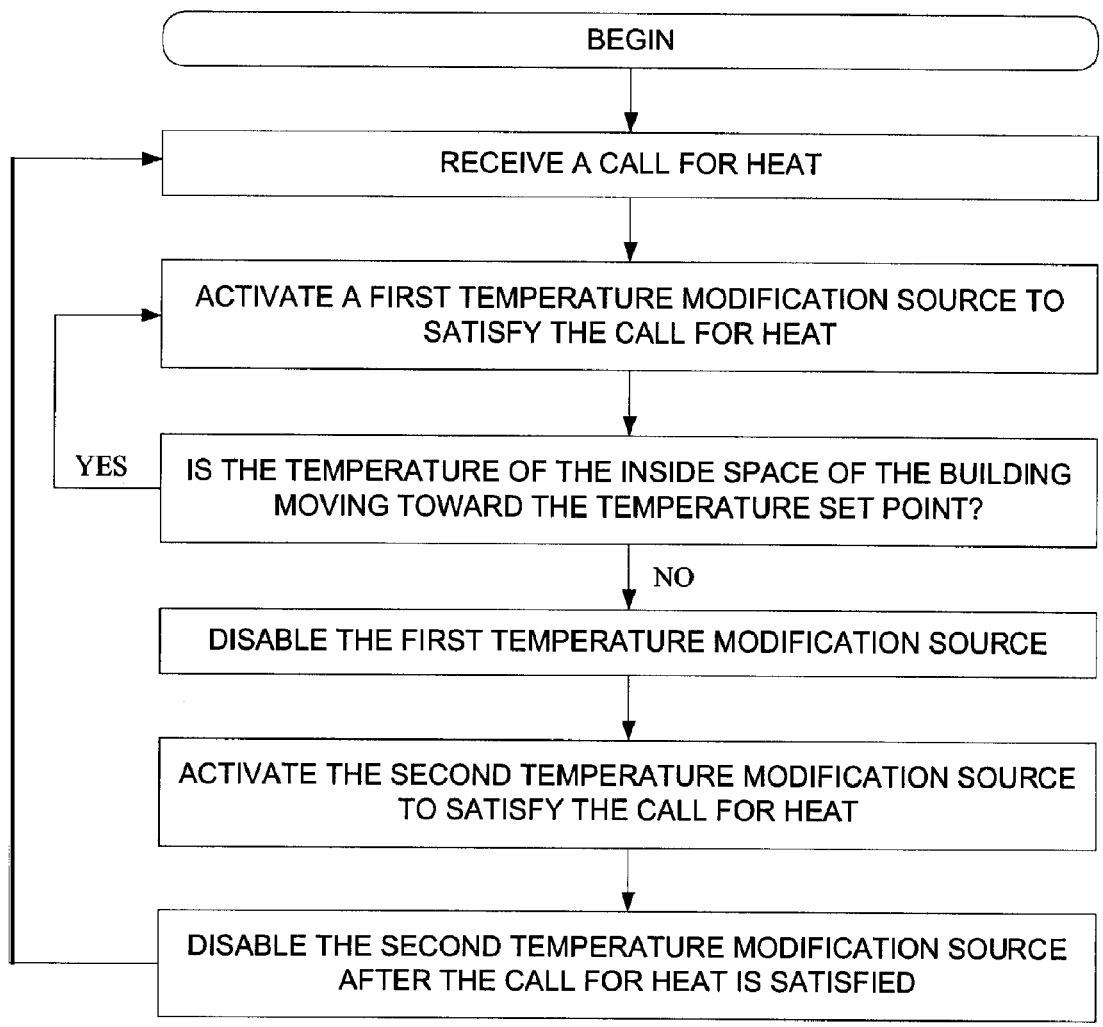

In some embodiments, a first temperature measurement of the inside space is taken at the start of a call for heat, when the first temperature modification source is turned on. A second temperature measurement is then taken at a predetermined time later and a determination is made of whether the first temperature modification source has satisfied the call for heat within the predetermined period of time. One illustrative method is shown in FIG. 4. If the temperature increases from the first to the second temperature measurement at an adequate rate, the first temperature modification source is meeting the heating load of the inside space and the second heating source is not needed. If, however, the inside temperature falls from the first to the second measurements, or if the temperature does not increase at an adequate rate, it might be concluded that the first temperature modification source is failing to meet the heating load of the building. In this case, the first temperature modification source may be disabled in favor of activating the second heat source that generally has a greater heating capacity and can heat the inside space faster than the first temperature modification source. One illustrative method is shown in FIG. 5.

The second temperature modification source may remain activate until the call for heat is satisfied or until the inside temperature is within a predetermined range of the inside air temperature set point. In some cases, the second temperature modification source may remain activated for a predetermined period of time after the inside temperature is within the predetermined range of the inside air temperature set point. Then, the second temperature modification source may be disabled, and the first temperature modification source may again be activated. See FIG. 3.

In some illustrative embodiments, once the second temperature modification source is activated, the system switches back to the first temperature modification source when the outside air temperature changes by a predetermined amount. For example, a rise in outside air temperature of 5 degrees could be sufficient for the first heat source to satisfy the inside heating requirements of the building. Once the first heat source is activated and the second heat source is disabled, another determination may be made regarding whether the temperature inside is moving away from or not reaching the temperature set point. If this happens, the first heat source is once again disabled and the second heat source is activated.

Such a method of frequently determining the ability of the first heat source to satisfy the heat requirements of the inside space, and switching back to the first heat source as often as feasible may provide a more energy and cost efficient system. Similarly, in a cooling system, a drop in temperature of, for example, 5-10 degrees could allow a first cooling source to adequately provide the desired cooling, even when the outside temperature remains above a level at which the first cooling source ordinarily operates effectively.

For example, in a system having a heat pump as the first temperature modification source and a fossil fuel furnace as the second temperature modification source, when the outside weather conditions and/or the inside heat demand are such that the heat pump cannot maintain the temperature set point, the interior temperature drops during the heating cycle. The system monitors the inside temperature and determines that the inside temperature is moving away from the set point during the heating cycle, indicating a failure to heat condition. The heat pump is disabled and the furnace is activated to provide the heat necessary for the inside temperature to reach the set point. However, while the furnace is activated, a rise in the outside temperature may create a situation in which the heat pump would be capable of meeting the heating need. The system monitors the outside temperature and if the temperature rises by a predetermined amount, the furnace is disabled and the heat pump is again activated. This switch from furnace to heat pump may occur at any time during the furnace heating cycle, regardless of whether the inside temperature set point has been reached. After activating the heat pump, the system monitors the temperature of the inside space to determine if the temperature is approaching the set point. If the inside temperature does not reach the set point, the heat pump is again disabled and the furnace is reactivated. A system that switches between heat pump and furnace based on a combination of inside temperature change and outside temperature change may allow for increased usage of the more energy efficient heat pump while maintaining the desired inside temperature set point.

In a further embodiment, the switch from secondary temperature modification source back to the first temperature modification source is based on a time delay. Initially when a call for heat is received, the second temperature modification source is disabled and the first temperature modification source is at least selectively activated. During the heating cycle of the first temperature modification source, if the temperature of the inside space of the building is moving away from or not reaching the set point, the first temperature modification source is disabled and the second temperature modification source is activated. After a predetermined period of time, the second temperature modification source is disabled and the first temperature modification source is at least selectively activated. The temperature of the inside space is again monitored during the heating cycle of the first temperature modification source, and if the temperature moves away from or does not reach the set point, the first temperature modification source is again disabled and the second temperature modification source is activated. In some embodiments, the predetermined period of time is set by the user.

Figure 6:
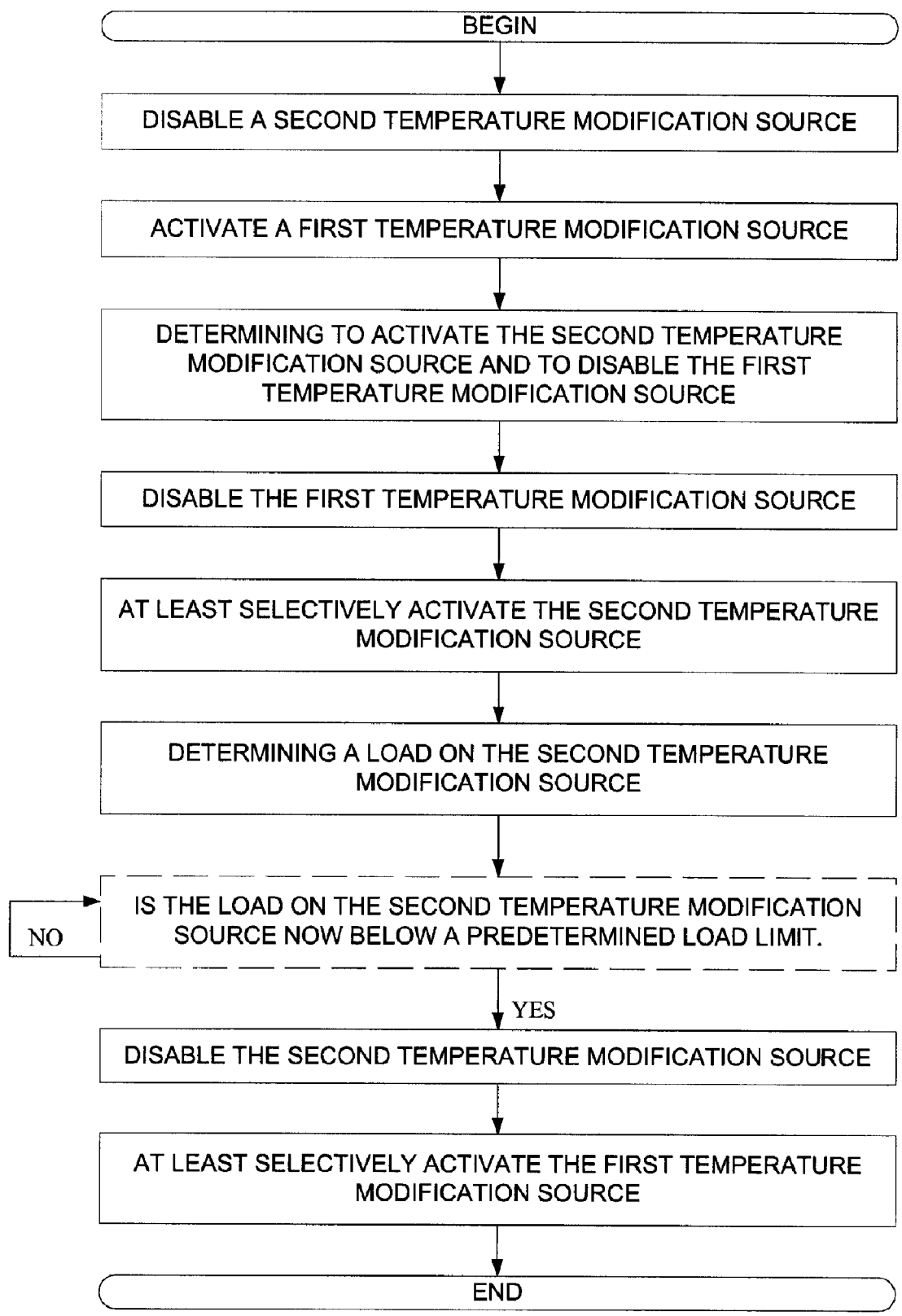

In some embodiments, while the second temperature modification source is at least selectively activated, its load is determined. The load is monitored over time while the temperature modification source is running, and if the current load falls below a load limit, the second temperature modification source is disabled and the first temperature modification source is at least selectively activated. One illustrative method is shown in FIG. 6. The load on the second temperature modification source can be determined in a number of ways. In an embodiment where the second temperature modification source is a fossil fuel furnace, the percentage of output or the length of the duty cycle are measurements of the load. When the length of the duty cycle is used to determine the load on the furnace, the duty cycle length is compared to a predetermined duty cycle length, and the furnace is disabled and the first temperature modification source is reactivated if the duty cycle is less than the predetermined value. A shorter duty cycle indicates a lower heating load for the furnace. In such a situation, the first temperature modification source may be capable of meeting the heating requirements.

This illustrative method of switching from the second to the first temperature modification source based on the load on the second source may provide for a cost-effective heating method of the interior space because the first temperature modification source is utilized as much as possible.

Figure 7:
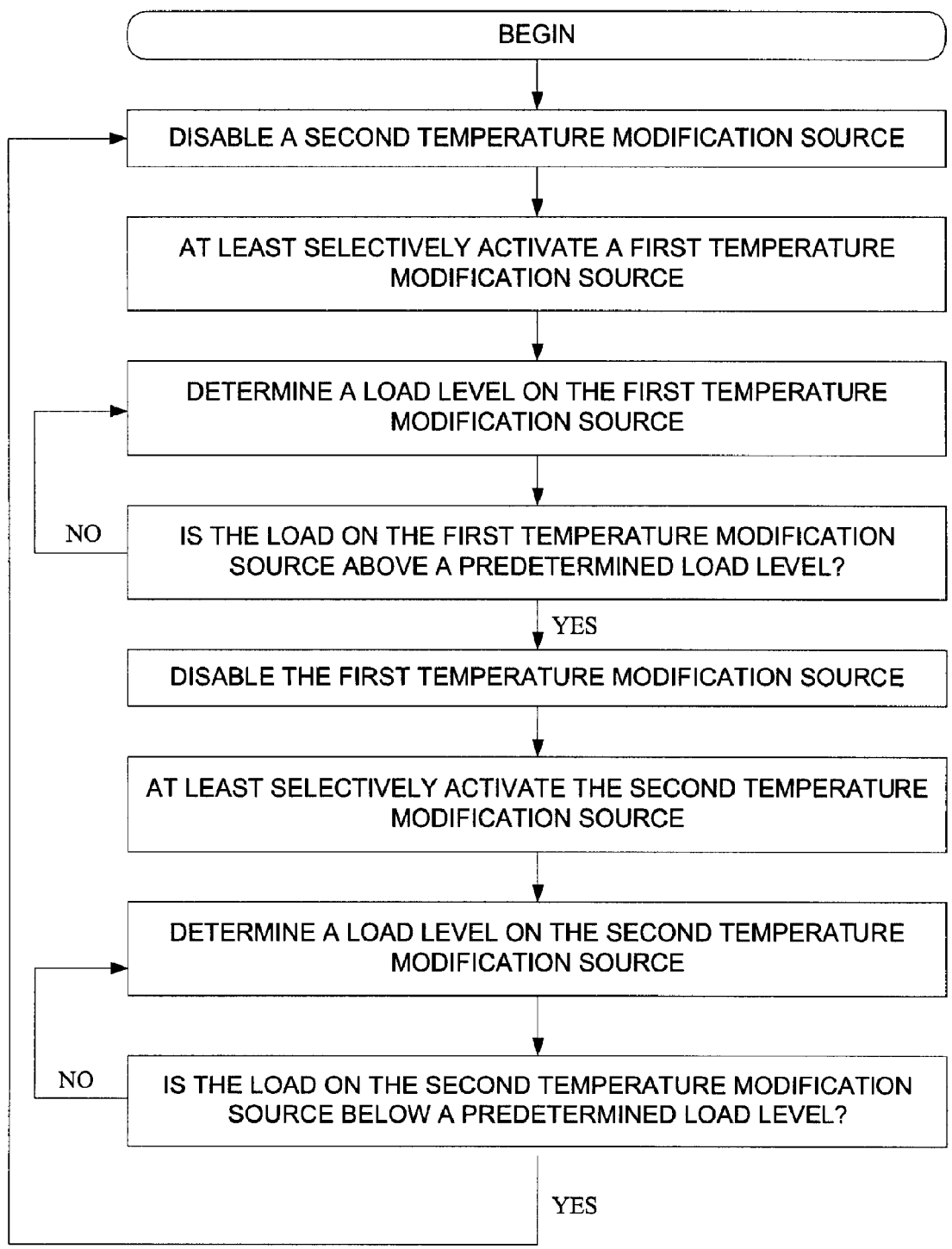

In another embodiment, after the first temperature modification source is at least selectively activated, the load on the source is measured, and if the load exceeds a predetermined level, the first temperature modification source is disabled and the second temperature modification source is at least selectively activated. One illustrative method is shown in FIG. 7. The load on the first temperature modification source can be determined in a number of ways, including, but not limited to, measuring the percent output or measuring the duty cycle. A load exceeding the predetermined level indicates the first temperature modification source will likely not succeed in providing the required heat. Switching from the first temperature modification source to the second temperature modification source based on this load determination allows the heating system to maintain a relatively constant inside temperature.

A further monitoring step involves determining the load on the second temperature modification source, and if the load falls below a predetermined level, disabling the second source and at least selectively activating the first temperature modification source. In situations where the first temperature modification source is not able to provide adequate heat and the second source has been activated, this further monitoring step may allow the system to return to the first temperature modification source when an environmental condition changes that will allow the first temperature modification source to again maintain the desired inside temperature. The load levels of the first and second temperature modification sources are based on one or more operating conditions, including, but not limited to outside air temperature, outside humidity level, outside wind speed and direction, precipitation, time of day, time of year, presence of sunlight, temperature set point for the inside space, etc.

Figure 8:
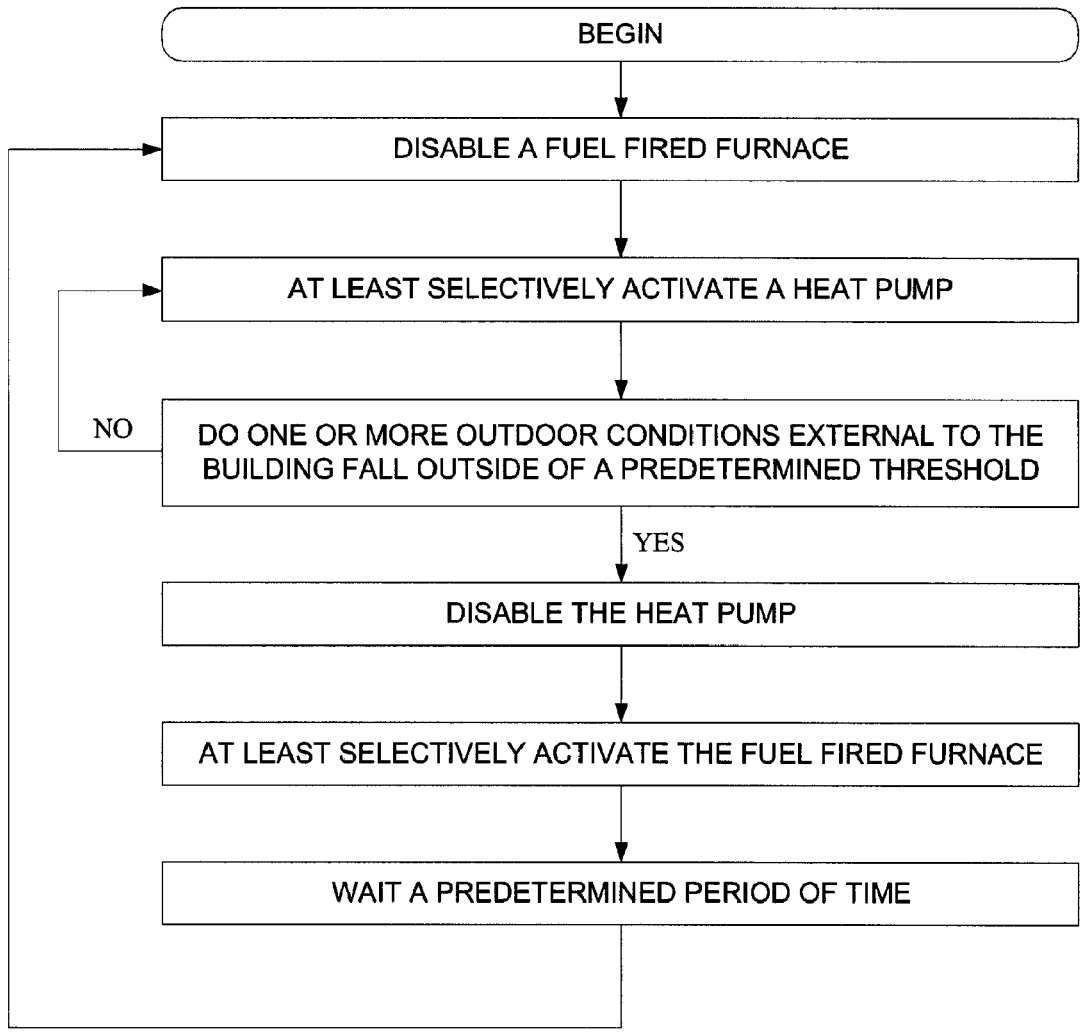

In one embodiment, a building heating system is a heating, ventilating, and air conditioning (HVAC) system including a heat pump and fuel fired furnace for providing heat, and a controller for monitoring and controlling the system. The controller has a temperature set point, generally provided by the user, below which a call for heat is made. When a call for heat is first made, the furnace is disabled and the heat pump is at least selectively activated. One or more outdoor conditions external to the building are monitored and if one or more such conditions fall outside a predetermined threshold, the heat pump is disabled and the furnace is at least selectively activated. After a predetermined period of time, the furnace is disabled and the heat pump is selectively activated. One illustrative method is shown in FIG. 8.

The outdoor conditions can include, but are not limited to, air temperature, humidity, wind direction, wind speed, precipitation, and sunlight. The outdoor conditions are monitored by one or more sensors generally located outside the building. In some embodiments, a solar sensor for detecting the presence and/or strength of sunlight is located inside the building. Under conditions of substantially no wind and strong sunlight, the heat pump may be able to satisfy the call for heat, even when the outdoor temperature is below that at which the heat pump would ordinarily not be effective. Conversely, under conditions of high winds, especially from the north, and no sunlight, the heat pump may not provide sufficient heat even though the outdoor air temperature is above that at which the heat pump is ordinarily an effective heat source. By basing the determination of when to switch between the heat pump and furnace or air conditioner on outdoor conditions, the system operates the more cost-efficient and energy-efficient heat pump as often as it is likely to provide the necessary heating or cooling. The system thus provides a cost efficient and energy efficient method of heating and cooling the building.

Figure 9:
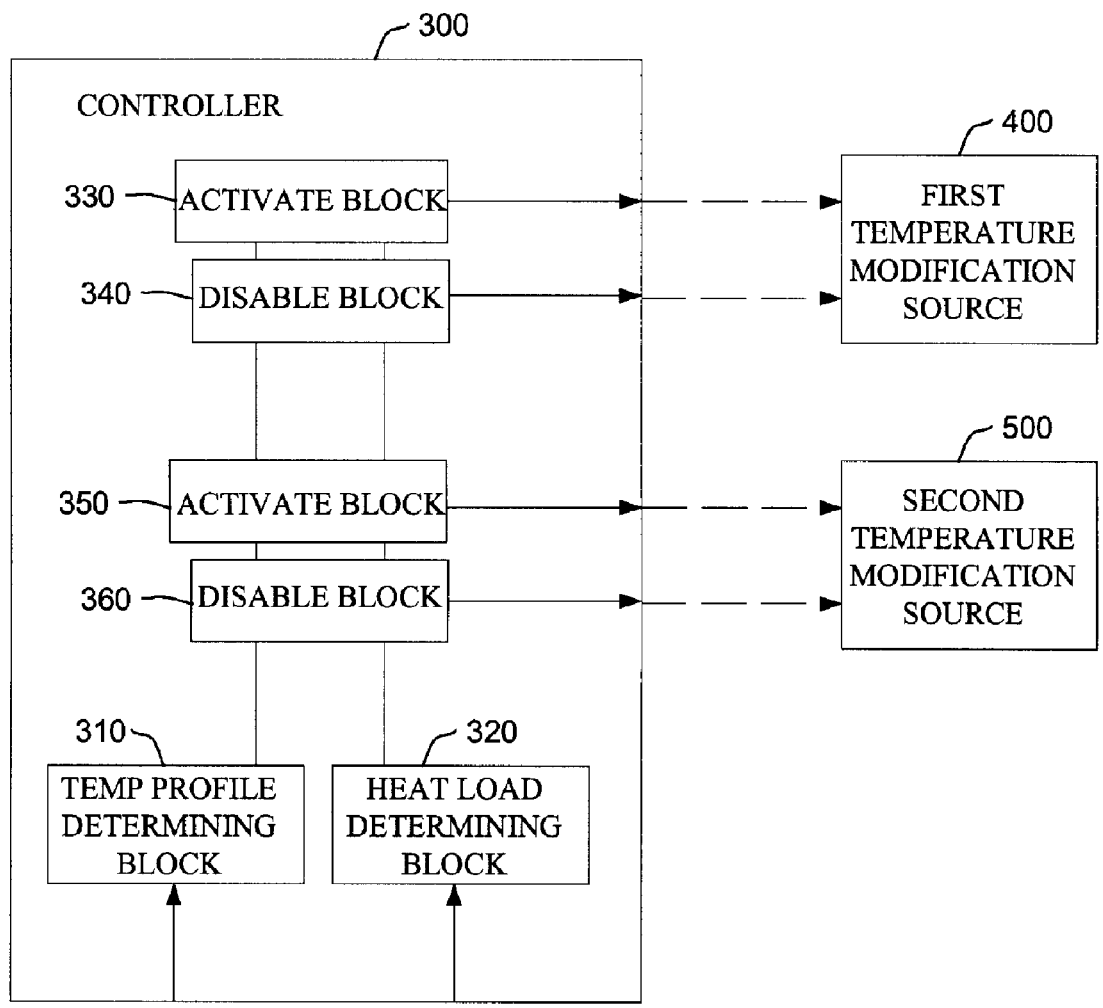
FIG. 9 is a block diagram of a controller for controlling an environmental control system having first and second temperature modification sources.

FIG. 9 is a block diagram of an illustrative controller 300 that controls an environmental control system having first 400 and second 500 temperature modification sources. The illustrative controller 300 includes a temperature profile-determining block 310. This block takes the input information regarding the inside and/or outside temperature and makes determinations as to whether the inside temperature is moving away from the temperature set point, not reaching the temperature set point within a predetermined period of time, and/or having a predetermined relationship with the temperature set point. The controller 300 also has a heat load-determining block 320 that takes the input information regarding the heat load on the first and/or second temperature modification sources and makes determinations as to whether the loads are above, at, or below predetermined levels.

The controller 300 contains activate 330 and disable 340 blocks for the first temperature modification source 400, and activate 350 and disable 360 blocks for the second temperature modification source 500. According to the determinations made at the temperature profile 310 and heat load 320 determining blocks, the controller 300 will activate 330, 350 and/or disable 340, 360 the first 400 and second 500 temperature modification sources. The controller 300 operates the environmental control system in a way that provides a cost efficient and energy efficient method of heating and cooling the building.

In some cases, the controller 300 may provide power through one or more relays or other switches to energize the temperature modification sources 400 and 500. Alternatively, or in addition, the controller 300 may be adapted to communicate (e.g. via Radio Frequency (RF) or wired) with a remote control module which provides power to energize the temperature modification sources 400 and 500. Alternatively, or in addition, it is contemplated that the controller 300 may be adapted to communicate (e.g. via RF or wired) directly with the temperature modification sources 400 and 500 and direct them to turn themselves on/off, as desired.

What is claimed is:

1. A method for controlling an environmental control system that services an inside space of a building, the environmental control system having a first temperature modification source and a second temperature modification source, both for modifying the temperature of the inside space of the building, the environmental control system further having a temperature set point, the method comprising:

disabling the second temperature modification source;
activating the first temperature modification source;
determining if the temperature of the inside space of the building is not reaching the temperature set point within a selected period of time, and if so:
disabling the first temperature modification source;
at least selectively activating the second temperature modification source;
measuring the outside temperature; and determining if the outside temperature has changed by a predetermined amount, and if so:
disabling the second temperature modification source and at least selectively activating the first temperature modification source.

2. A method for controlling an environmental control system that services an inside space of a building, the environmental control system having a first temperature modification source and a second temperature modification source, both for modifying the temperature of the inside space of the building, the environmental control system further having a temperature set point, the method comprising:
disabling the second temperature modification source;
activating the first temperature modification source;
determining if the temperature of the inside space of the building is not reaching the temperature set point within a selected period of time, and if so:
disabling the first temperature modification source; and
at least selectively activating the second temperature modification source;
after the second temperature modification source is at least selectively activated, determining if/when the temperature of the inside space of the building has a predetermined relationship with the temperature set point, and if so:
disabling the second temperature modification source; and
at least selectively activating the first temperature modification source.

3. The method of claim 2, wherein the second temperature modification source modifies the temperature of the inside space more rapidly than the first temperature modification source, at least under current operation conditions.

4. The method of claim 2, wherein the second temperature modification source is less efficient to operate than the first temperature modification source under current operation conditions.

5. The method of claim 2 further comprising the step of:
waiting a selected period of time after the temperature of the inside space of the building has a predetermined relationship with the temperature set point before disabling the second temperature modification source and at least selectively activating the first temperature modification source.

6. The method of claim 2 comprising the steps of:
receiving a call for heat;
activating the first temperature modification source to satisfy the call for heat;
determining if the first temperature modification source is able to satisfy the call for heat within the selected period of time, and if not;
disabling the first temperature modification source;
activating the second temperature modification source to satisfy the call for heat;
disabling the second temperature modification source after the call for heat is satisfied; and
returning to the receiving a call for heat step.

7. The method of claim 2 comprising the steps of:
receiving a call for heat;
activating the first temperature modification source to satisfy the call for heat;
determining if the temperature of the inside space of the building is not moving toward the temperature set point, and if not;
disabling the first temperature modification source;
activating the second temperature modification source to satisfy the call for heat;
disabling the second temperature modification source after the call for heat is satisfied; and
returning to the receiving a call for heat step.

8. The method of claim 2 wherein the first temperature modification source is a heat pump.

9. The method of claim 2 wherein the second temperature modification source is a fuel fired furnace.

10. The method of claim 2 wherein the second temperature modification source is an electrically powered heater.

11. The method of claim 2 wherein the second temperature modification source is an electrically powered air conditioner.

12. A method for controlling an environmental control system that services an inside space of a building, the environmental control system having a first temperature modification source and a second temperature modification source, both for modifying the temperature of the inside space of the building, the environmental control system further having a temperature set point, the method comprising:
receiving a call for heat;
activating the first temperature modification source to satisfy the call for heat;
determining if the first temperature modification source is able to satisfy the call for heat within a selected period of time, and if not;
disabling the first temperature modification source;
activating the second temperature modification source to satisfy the call for heat;
disabling the second temperature modification source after the call for heat is satisfied; and
returning to the receiving a call for heat step.

13. The method of claim 12 wherein the first temperature modification source is a heat pump.

14. The method of claim 13 wherein the second temperature modification source is a fuel fired furnace.

15. The method of claim 12 wherein the second temperature modification source is an electrically powered heater.

16. A method for controlling an environmental control system that services an inside space of a building, the environmental control system having a first temperature modification source and a second temperature modification source, both for modifying the temperature of the inside space of the building, the environmental control system further having a temperature set point, the method comprising:
receiving a call for heat;
activating the first temperature modification source to satisfy the call for heat;
determining if the temperature of the inside space of the building does not reach the temperature set point within a selected period of time, and if not;
disabling the first temperature modification source;
activating the second temperature modification source to satisfy the call for heat;
disabling the second temperature modification source after the call for heat is satisfied; and
returning to the receiving a call for heat step.

17. The method of claim 16 wherein the first temperature modification source is a heat pump.

18. The method of claim 17 wherein the second temperature modification source is a fuel fired furnace.

19. The method of claim 17 wherein the second temperature modification source is an electrically powered heater.

20. A controller for controlling an environmental control system that services an inside space of a building, the environmental control system having a first temperature modification source and a second temperature modification source, both for modifying the temperature of the inside space of the building, the environmental control system further having a temperature set point, the controller comprising:

means for disabling the second temperature modification source;

means for at least selectively activating the first temperature modification source;

means for determining if the temperature of the inside space of the building is not reaching the temperature set point within a selected period of time, and when so:

means for disabling the first temperature modification source;

means for at least selectively activating the second temperature modification source;

means for determining if/when the temperature of the inside space of the building has a predetermined relationship with the temperature set point after the second temperature modification source is at least selectively activated, and when so:

means for disabling the second temperature modification source; and means for at least selectively activating the first temperature modification source.

21. A method for controlling an environmental control system that services an inside space of a building, the environmental control system having a first temperature modification source and a second temperature modification source for modifying the temperature of the inside space of the building, the environmental control system further having a temperature set point, the method comprising:

disabling the second temperature modification source;

at least selectively activating the first temperature modification source;

determining to activate the second temperature modification source and to disabled the first temperature modification source;

disabling the first temperature modification source;

at least selectively activating the second temperature modification source;

determining a load on the second temperature modification source;

determining if/when the load on the second temperature modification source falls below a selected load limit, and if so:

disabling the second temperature modification source; and at least selectively activating the first temperature modification source.

22. A method for controlling an environmental control system that services an inside space of a building, the environmental control system having a first temperature modification source and a second temperature modification source for modifying the temperature of the inside space of the building, the environmental control system further having a temperature set point, the method comprising:

disabling the second temperature modification source;

at least selectively activating the first temperature modification source;

determining a load on the first temperature modification source, and if the load on the first temperature modification source exceeds a selected load level:

disabling the first temperature modification source;

at least selectively activating the second temperature modification source;

determining if/when the load on the second temperature modification source falls below a selected load level, and if so:

disabling the second temperature modification source; and at least selectively activating the first temperature modification source.

23. The method of claim 22 wherein the selected load level of the first temperature modification device and the selected load level of the second temperature modification device are based at least in part on one or more operating conditions.

24. The method of claim 23 wherein the one or more operating conditions include one or more of an outside air temperature, an outside humidity level, an outside wind speed, an outside wind direction, a precipitation value, a time of day value, a time of year value, and a temperature set point for the inside space.

25. A method for controlling an HVAC system that services an inside space of a building, the HVAC system including a heat pump and a fuel fired furnace for modifying the temperature of the inside space of the building, the HVAC system further including a controller and a current temperature set point, the method comprising:

disabling the fuel fired furnace;

at least selectively activating the heat pump;

determining if one or more outdoor conditions external to the building fall outside of a selected threshold, and if so:

disabling the heat pump;

at least selectively activating the fuel fired furnace;

waiting a selected period of time, and then:

disabling the fuel fired furnace; and at least selectively activating the heat pump.

26. A method for controlling an environmental control system that services an inside space of a building, the environmental control system having a first temperature modification source and a second temperature modification source, both for modifying the temperature of the inside space of the building, the environmental control system further having a temperature set point, the method comprising:

disabling the second temperature modification source;

activating the first temperature modification source;

determining if the temperature of the inside space of the building is moving away from the temperature set point, and/or not reaching the temperature set point within a selected period of time, and if so:

disabling the first temperature modification source;

at least selectively activating the second temperature modification source;

measuring the outside temperature;

determining if the outside temperature has changed by a predetermined amount, and if so:

disabling the second temperature modification source and at least selectively activating the first temperature modification source.

27. A method for controlling an environmental control system that services an inside space of a building, the environmental control system having a first temperature modification source and a second temperature modification source, both for modifying the temperature of the inside space of the building, the environmental control system further having a temperature set point, the method comprising:

disabling the second temperature modification source;

activating the first temperature modification source;

determining if the temperature of the inside space of the building is moving away from the temperature set point, and/or not reaching the temperature set point within a selected period of time, and if so:

disabling the first temperature modification source;

at least selectively activating the second temperature modification source;

after the second temperature modification source is at least selectively activated, determining if/when the temperature of the inside space of the building has a predetermined relationship with the temperature set point, and if so:

disabling the second temperature modification source; and at least selectively activating the first temperature modification source.

* * * * *

UNITED STATES PATENT AND TRADEMARK OFFICE
CERTIFICATE OF CORRECTION

PATENT NO.      : 7,621,140 B2
APPLICATION NO. : 11/162212
DATED           : November 24, 2009
INVENTOR(S)     : Schnell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Twenty-sixth Day of October, 2010

David J. Kappos
*Director of the United States Patent and Trademark Office*